US011523157B2

United States Patent
Kolati et al.

(10) Patent No.: US 11,523,157 B2
(45) Date of Patent: Dec. 6, 2022

(54) METHOD AND MISSION CRITICAL SERVER FOR HANDLING RECEPTION OF MEDIA STREAMS IN MISSION CRITICAL SYSTEM

(71) Applicant: Samsung Electronics Co., Ltd., Gyeonggi-do (KR)

(72) Inventors: Naveen Kolati, Bangalore (IN); Kiran Gurudev Kapale, Bangalore (IN); Vinayak Goyal, Bangalore (IN); Sapan Pramodkumar Shah, Bangalore (IN); Nishant Gupta, Bangalore (IN); Siva Prasad Gundur, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/318,349

(22) Filed: May 12, 2021

(65) Prior Publication Data
US 2021/0360302 A1    Nov. 18, 2021

(30) Foreign Application Priority Data

May 13, 2020  (IN) ........................ 202041020119 PS
Apr. 29, 2021  (IN) ........................ 202041020119 CS

(51) Int. Cl.
*H04N 7/173*     (2011.01)
*H04N 21/242*    (2011.01)
(Continued)

(52) U.S. Cl.
CPC ......... *H04N 21/242* (2013.01); *H04N 21/238* (2013.01); *H04N 21/2402* (2013.01)

(58) Field of Classification Search
CPC ............... H04N 21/242; H04N 21/238; H04N 21/2402; H04N 7/147
See application file for complete search history.

(56) References Cited

U.S. PATENT DOCUMENTS

2009/0083810 A1*  3/2009  Hattori ............... H04N 21/6405
                                                725/92
2015/0120809 A1*  4/2015  Braemer ................. H04L 67/01
                                                709/203
(Continued)

FOREIGN PATENT DOCUMENTS

EP        2363998 A1 *   9/2011    ............. H04L 67/20

OTHER PUBLICATIONS

3GPP, 3rd Generation Partnership Project; Technical Specification Group Core Network and Terminals; Mission Critical Video (MCVideo) Media Plane, Control; Protocol Specification (Release 16), 3GPP TS 24.581 V16.4.0, Mar. 2020, 200 pages.
(Continued)

*Primary Examiner* — Gigi L Dubasky
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as long term evolution (LTE). A method for handling reception of a plurality of media streams in a mission critical (MC) system is provided. The method includes transmitting, by an MC server, a request to each of one or more receiving devices for receiving a plurality of media streams from a plurality of transmitting devices; receiving, by the MC server, a response from each one of the one or more receiving devices for receiving a number of media streams among the plurality of media streams transmitted by the one or more of the plurality of transmitting devices and updating the number of media streams to be received by each one of the one or more receiving devices as a counter value; identifying, by the MC server, the one or more receiving devices intended to receive the media streams from the one or more of the plurality of transmitting (Continued)

devices based on a synchronization source (SSRC) identifier associated with media streams of each of the one or more of the plurality of transmitting devices and the counter value; and transmitting, based on the SSRC identifier and the counter value, by the MC server, media streams from the one or more of the plurality of transmitting devices to the identified one or more receiving devices.

20 Claims, 10 Drawing Sheets

(51) Int. Cl.
*H04N 21/24* (2011.01)
*H04N 21/238* (2011.01)

(56) References Cited

U.S. PATENT DOCUMENTS

| | | | |
|---|---|---|---|
| 2018/0132072 A1 | 5/2018 | Hyun et al. | |
| 2018/0242120 A1 | 8/2018 | Baek et al. | |
| 2019/0098692 A1 | 3/2019 | Atarius et al. | |
| 2019/0150222 A1 | 5/2019 | Ge et al. | |
| 2019/0334969 A1* | 10/2019 | Ge | H04L 65/4092 |

OTHER PUBLICATIONS

International Search Report dated Aug. 12, 2021 issued in counterpart application No. PCT/KR2021/005949, 9 pages.

* cited by examiner

METHOD AND MISSION CRITICAL SERVER FOR HANDLING RECEPTION OF MEDIA STREAMS IN MISSION CRITICAL SYSTEM

CROSS-REFERENCE TO RELATED APPLICATION(S)

This application is based on and claims priority under 35 U.S.C. § 119(a) to Indian Provisional Patent Application Serial No. 202041020119 (PS), filed on May 13, 2020, in the Indian Intellectual Property Office, and to Indian Complete Patent Application Serial No. 202041020119 (CS), filed on Apr. 29, 2021, in the Indian Intellectual Property Office, the disclosures of each of which are incorporated herein by reference in their entireties.

BACKGROUND

1. Field

The present disclosure relates generally to a mission critical (MC) video communication offered over wireless communication networks, and more particularly, to a method and an MC server to handle reception of a plurality of media streams in an MC system.

2. Description of the Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a "beyond 4G network" or a "post long term evolution (LTE) system".

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation.

In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

MC services are regarded as critical to an operation, such that any disruption or failure with respect to reception of a data pertaining to such service may be catastrophic and probable to cause fatalities since mission-critical service is known to be related to preventing loss of human life and property. For example, MCVideo is one of the services used for mission critical audio-video communication in multi-user environments or multiple location environments. Such services may be used by agencies providing public safety services such as police-services, fire services, and ambulance services. Therefore, in order to help improve public safety-related emergency-situations, mission-critical services need to be rendered with high accessibility, high availability, high reliability, low latency, many real-time operating capabilities, interoperability with other services and systems, private and group communications, the ability to handle emergencies and to provide prioritization, pre-emption, queuing, and an improved quality of service.

In MCVideo systems, there can be multiple MCVideo clients transmitting media streams simultaneously in a single group communication. Consequently, an MCVideo client should be able to receive one or more media streams from the server simultaneously. So, the server should be able to handle the transmission of multiple simultaneous media streams in a single group communication for that MCVideo client, which results in complications in handling the media streams at the MCVideo server.

The transmission control server consists of a "general reception control operation", as described in subclause 6.3.6 of the $3^{rd}$ Generation Partnership Project (3GPP) TS 24.581 and "basic reception control operation towards the transmission participant", as described in subclause 6.3.7 of 3GPP TS 24.581. These state machines insufficiently handle the transmission of multiple simultaneous media streams in a single group communication for an MCVideo user who is requesting to receive media.

SUMMARY

The present disclosure has been made to address the above-mentioned problems and disadvantages, and to provide at least the advantages described below.

According to an aspect of the present disclosure, a method for handling reception of a plurality of media streams in an MC system includes transmitting, by an MC server, a request to each of one or more receiving devices for receiving a plurality of media streams from a plurality of transmitting devices; receiving, by the MC server, a response from each one of the one or more receiving devices for receiving a number of media streams among the plurality of media streams transmitted by the one or more of the plurality of transmitting devices and updating the number of media streams to be received by each one of the one or more receiving devices as a counter value; identifying, by the MC server, the one or more receiving devices intended to receive the media streams from the one or more of the plurality of transmitting devices based on a synchronization source (SSRC) identifier associated with media streams of each of the one or more of the plurality of transmitting devices and the counter value; and transmitting, based on the SSRC identifier and the counter value, by the MC server, media streams from the one or more of the plurality of transmitting devices to the identified one or more receiving devices.

According to another aspect of the present disclosure, for handling a plurality of media stream receptions in an MC system, the MC server includes at least one processor; a transceiver; and a memory communicatively coupled to the processor. The memory stores processor-executable instructions, which upon execution, cause the processor to transmit a request to each of one or more receiving devices for receiving plurality of media streams from a plurality of transmitting devices; receive a response from each one of the one or more receiving devices for receiving a number of media streams among the plurality of media streams from the one or more of the plurality of transmitting devices and update the number of media streams as a counter value;

identify the one or more receiving devices intended to receive the media streams from one or more of the plurality of transmitting devices based on an SSRC identifier associated with the media streams of each of the one or more of the plurality of transmitting devices and the counter value; and transmit, based on the SSRC identifier and the counter value, the media streams from the one or more of the plurality of transmitting devices to the identified one or more receiving devices.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
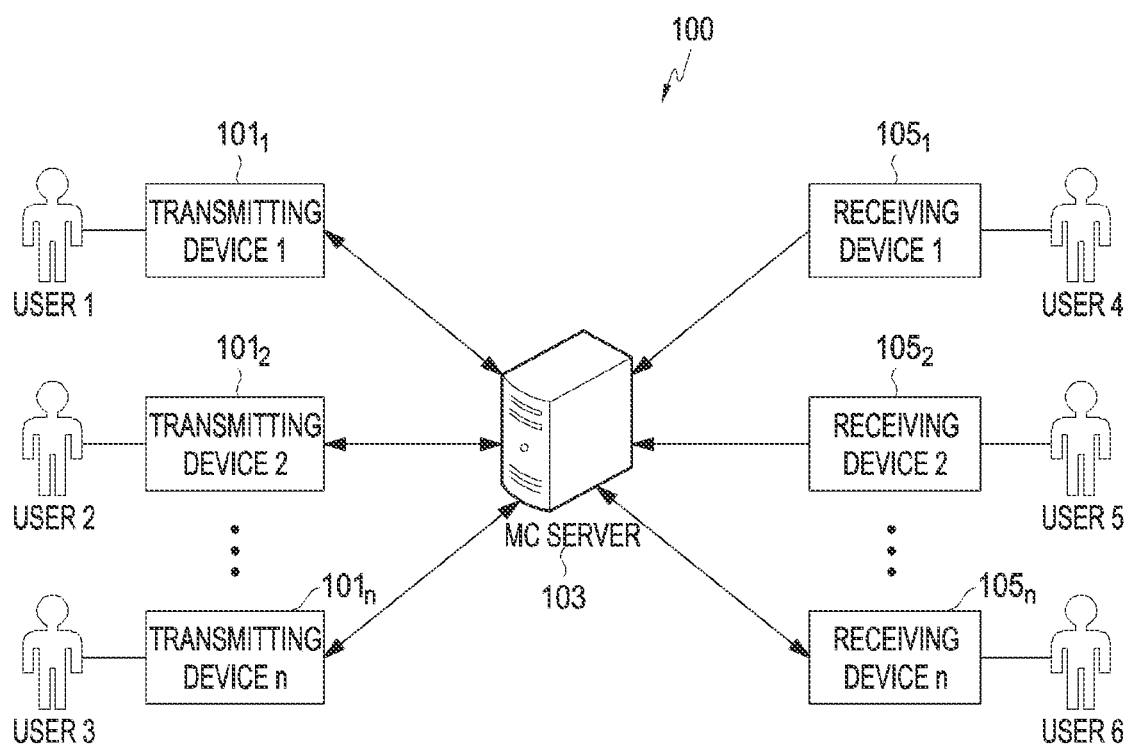
FIG. 1A illustrates an environment for handling reception of a plurality of media streams in an MC system, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The present disclosure relates to a method for handling the reception of a plurality of media streams in MC systems. The present disclosure provides two solutions to address the aforementioned problems, the first solution introduces a new reception controller state which, along with a "stream reception control operation" state machine and a "basic reception control operation towards the transmission participant" state machine, handles complexities in multiple stream scenarios. The second solution introduces a new counter at server to handle complexities related to multiple receptions. Both solutions can be used individually, or a combination of both solutions can be used to solve multiple stream reception complexities at a server.

Further, the present disclosure may relate to an MC server for handling reception of a plurality of media streams in an MC system. In addition, the present disclosure may also relate to a method for handling reception of a plurality of media streams in an MC system.

The word "exemplary" is used herein to mean "serving as an example, instance, or illustration." Any embodiment or implementation of the present subject matter described as "exemplary" is not necessarily to be construed as preferred or advantageous over other embodiments.

While the disclosure is susceptible to various modifications and alternative forms, specific embodiments thereof has been shown by way of example in the drawings and will be described in detail below. It should be understood, however that these specific embodiments are not intended to limit the disclosure to the forms disclosed, but on the contrary, the disclosure is to cover all modifications, equivalents, and alternatives falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such a setup, device or method. In other words, one or more elements in a system or apparatus proceeded by "comprises" does not, without more constraints, preclude the existence of other elements or additional elements in the system or method.

The present disclosure relates to a method and MC server for handling reception of a plurality of media streams in an MC system. As disclosed in the Background section, the simultaneous reception of multiple media streams to a particular client results in complications in handling media streams at the MC server.

Thus, the present disclosure discloses how simultaneous reception of multiple media streams may be possible in a single group communication. To this effect, the MC server transmits a request to each of one or more receiving devices associated with the MC server for receiving a plurality of media streams sent from a plurality of transmitting devices. The MC server may receive a response from each of the one or more receiving devices for receiving a number of media streams among the plurality of media streams sent from one or more of the plurality of transmitting devices. The number of media streams accepted by the receiving devices may be updated as a counter value for that particular receiving device and stored at the MC server. The counter value may be incremented by 1 for each stream accepted by receiving device and decremented by 1 when a previously accepted stream is ended by the receiving device.

Thereafter, the MC server may identify the one or more receiving streams accepted by the receiving device based on an SSRC identifier associated with media streams sent from each of the one or more of the plurality of transmitting devices. Each media stream may be associated with the SSRC identifier. So, based on the SSRC identifier and the counter, the MC server may identify the one or more receiving devices who are intended to receive the media streams from the one or more of the plurality of transmitting devices. Thereafter, the MC server may transmit the media streams based on the mapped SSRC identifier and the counter value to the identified one or more receiving devices. The media streams from the one or more of the plurality of transmitting devices are transmitted to the identified one or more receiving devices until the one or more receiving devices reject the request to receive the plurality of media streams from the one or more of the plurality of transmitting devices.

In addition, the present disclosure enables users to send a request for re-initiating transmission of the plurality of media streams, which are previously rejected, to receive the plurality of media streams from the one or more of the plurality of transmitting devices.

In this manner, in the present disclosure, the MC server solves complexities at the MC server for handling multiple media streams in a single group communication.

Figure 1B:
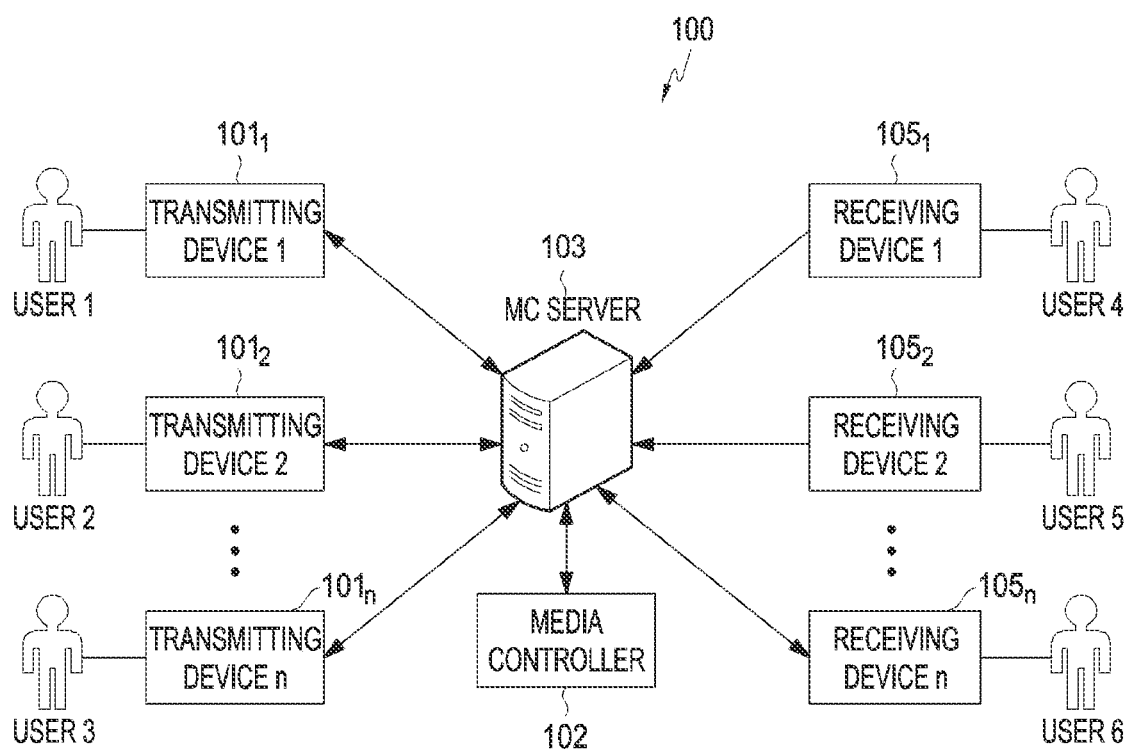
FIG. 1B illustrates an environment for handling reception of a plurality of media streams in an MC system, according to an embodiment.

FIGS. 1A-1B illustrate environments for handling reception of a plurality of media streams in an MC system, according to various embodiments.

Referring to FIGS. 1A-1B, the environment 100 includes one or more transmitting devices $101_1$ to $101_n$ (collectively referred as transmitting devices 101), an MC server 103, one or more receiving devices $105_1$ to $105_n$ (collectively referred as receiving device 105), and users associated with each of the transmitting devices 101 and the receiving devices 105. The MC server 103 may be employed in mission critical services used for mission critical audio-video communication in a multi-user environment or multiple location environment. The MC server 103 may be employed in services with a multi-user environment or a multi-location environment. The MC server 103 may be a server or a network entity.

A media controller may act as the MC server 103. As shown in FIG. 1B, the media controller 102 may be part of the MC server 103. The one or more transmitting devices 101 and the one or more receiving devices 105 may be associated with corresponding users. The one or more transmitting devices 101 and the one or more receiving devices 105 may be electronic devices which may include a mobile phone, a desktop computer, a tablet, and a laptop. One or more group may comprise one or more transmitting devices 101 and one or more receiving devices 105. In addition, a method of the present disclosure may be explained by considering one group among the one or more groups, and the method may be applicable for each of the one or more groups as well for managing the media stream reception. The media stream may include, but is not limited to, text, audio, video, and images.

The MC server 103 may transmit a request to each of the one or more receiving devices 105 for receiving a plurality of media streams, sent from plurality of transmitting devices 101. Thereafter, the MC server 103 may receive response from each of the one or more receiving devices 105 for receiving a number of media streams among the plurality of media streams sent from one or more of the plurality of transmitting devices 101. The information about the number of media streams may be stored or updated as a counter value for each of the one or more receiving devices 105 in a database associated with the MC server 103. The counter value may be a numerical value which is updated based on the number of media streams accepted or rejected by each of the one or more receiving devices 105. If the receiving device accepts a request to receive 2 media streams from the transmitting devices 101, then the counter value may be 2. If the receiving device later rejects the request to receive the media stream of an already accepted stream from one of the transmitting devices, then the counter value may be updated to 1. Thereafter, the MC server 103, may identify one or more receiving devices 105 who are intended to receive the media streams from the one or more of the plurality of transmitting devices 101 based on an SSRC identifier and counter value. Each media stream from the plurality of transmitting devices 101 is associated with the SSRC identifier.

The SSRC identifier may comprise information about the receiving stream that is intended to be received from the transmitting device. Once the one or more receiving devices 105 are identified, the MC server 103 may transmit the media streams from one or more of the plurality of transmitting devices 101 to the identified one or more receiving devices 105 based on the mapped SSRC identifier, and also based on the counter value. The MC server 103 may transmit the media streams from the one or more of the plurality of transmitting devices 101 to the identified one or more receiving devices 105 until the one or more receiving devices 105 rejects the request to receive the plurality of media streams from the one or more of the plurality of transmitting devices 101.

The one or more receiving devices 105 may send a request to the MC server 103 for re-initiating transmission of the plurality of media streams that were previously rejected. Upon receiving the request, the MC server 103 may check if the one or more of the plurality of transmitting devices 101 are still transmitting the media streams, and if so, then those media streams may be transmitted to the one or more receiving devices 105. However, if the one or more transmitting devices 101 terminate transmitting the media streams, then the MC server 103 may transmit a notification message to each of the one or more receiving devices 105 indicating that the one or more transmitting devices 101 has terminated the process of transmitting the media streams.

Figure 2A:
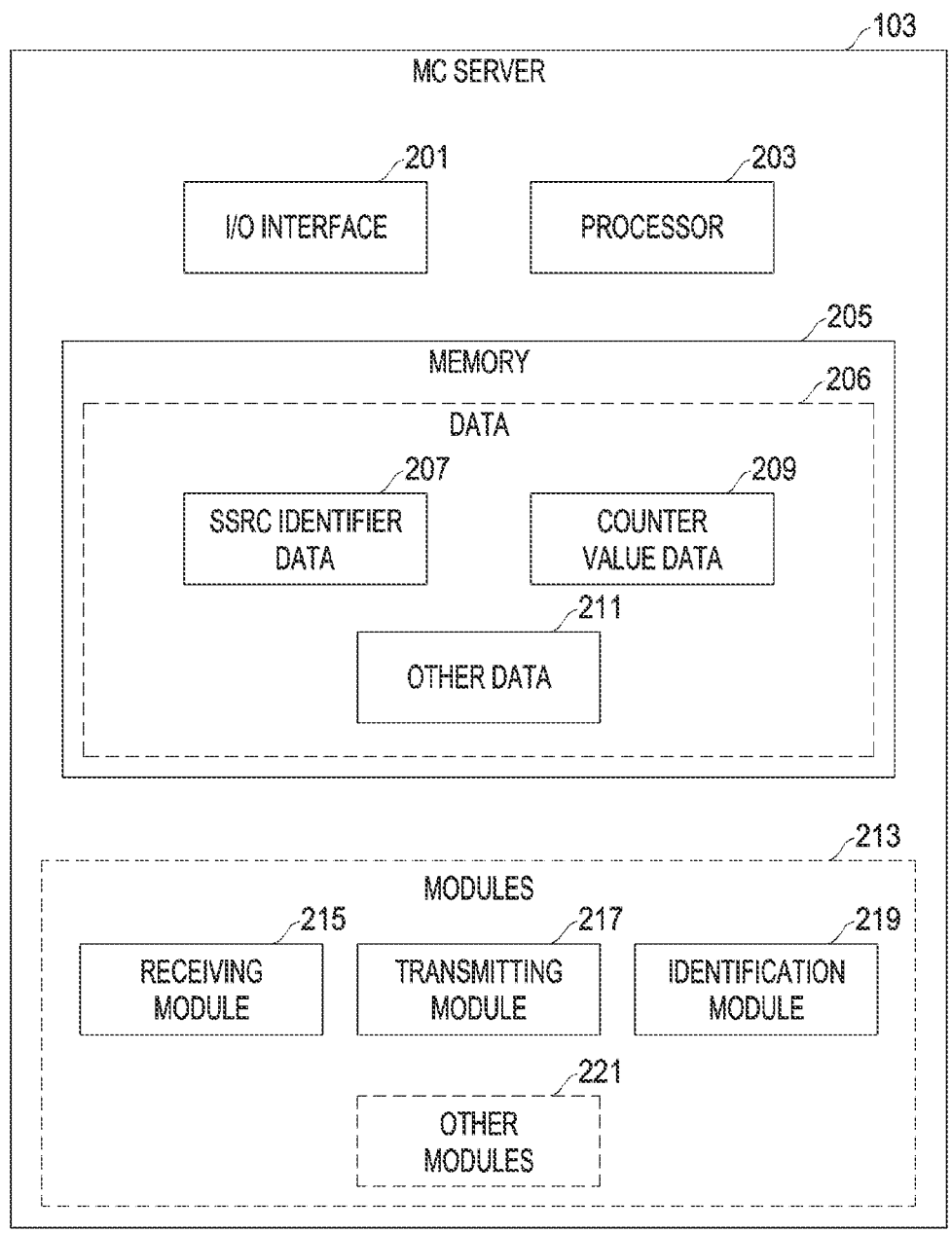
FIG. 2A illustrates a block diagram of an MC server for handling reception of a plurality of media streams in an MC system, according to an embodiment.

FIG. 2A illustrates a block diagram of an MC server for handling reception of a plurality of media streams in an MC system, according to an embodiment.

Referring to FIG. 2A, the MC server 103 includes an I/O interface 201, a processor 203, and a memory 205. The I/O interface 201 may be configured to send/receive a request regarding media stream transmission. The processor 203 may be configured to handle a plurality of media stream receptions. The MC server 103 includes data 206 and modules 213. As shown in the FIG. 2A, the data 206 is stored in the memory 205 that is configured in the MC server 103. The data 206 may include SSRC identifier data 207, counter value data 209 and other data 211.

The data 206 may be stored in the memory 205 in the form of various data structures. Additionally, the data 206 can be organized using data models, such as relational or hierarchical data models. The other data 211 may store temporary data and temporary files generated by the modules 213 for performing the various functions of the MC server 103.

The data 206 stored in the memory 205 may be processed by the modules of the system 103. The modules 213 may be stored within the memory 205. The modules 213 may be communicatively coupled to the processor 203 and may be configured in the MC server 103, which may also be present outside the memory 205, as shown in FIG. 2A and implemented as hardware.

As used herein, the term "module" may refer to an application specific integrated circuit (ASIC), an electronic circuit, a processor (a shared processor, a dedicated processor, or a group processor) and a memory that execute one or more software or firmware programs, a combinational logic circuit, and/or other suitable components that provide the described functionality.

Referring to FIG. 2A, the modules 213 include a receiving module 215, a transmitting module 217, an identification module 219 and other modules 221. The other modules 221 may be used to perform various miscellaneous functions of the MC server 103. It will be appreciated that such aforementioned modules may be represented as a single module or a combination of different modules.

Furthermore, a person of ordinary skill in the art will appreciate that in an implementation, the one or more modules 213 may be stored in the memory 205, without limiting the scope of the disclosure. Modules 213, when configured with the functionality defined in the present disclosure, will result in a novel hardware.

The receiving module 215 may be configured to receive a request or response from the one or more receiving devices 105.

The transmitting module 217 may be configured to transmit a request to each of the one or more receiving devices 105 for receiving media streams sent from plurality of transmitting devices 101. Also, the transmitting module 217 may be configured to transmit media streams to one or more receiving devices 105. There may be four transmitting devices 101 and two receiving devices 105 in a group that is associated with the MC server 103, as shown in FIG. 2B.

Figure 2B:
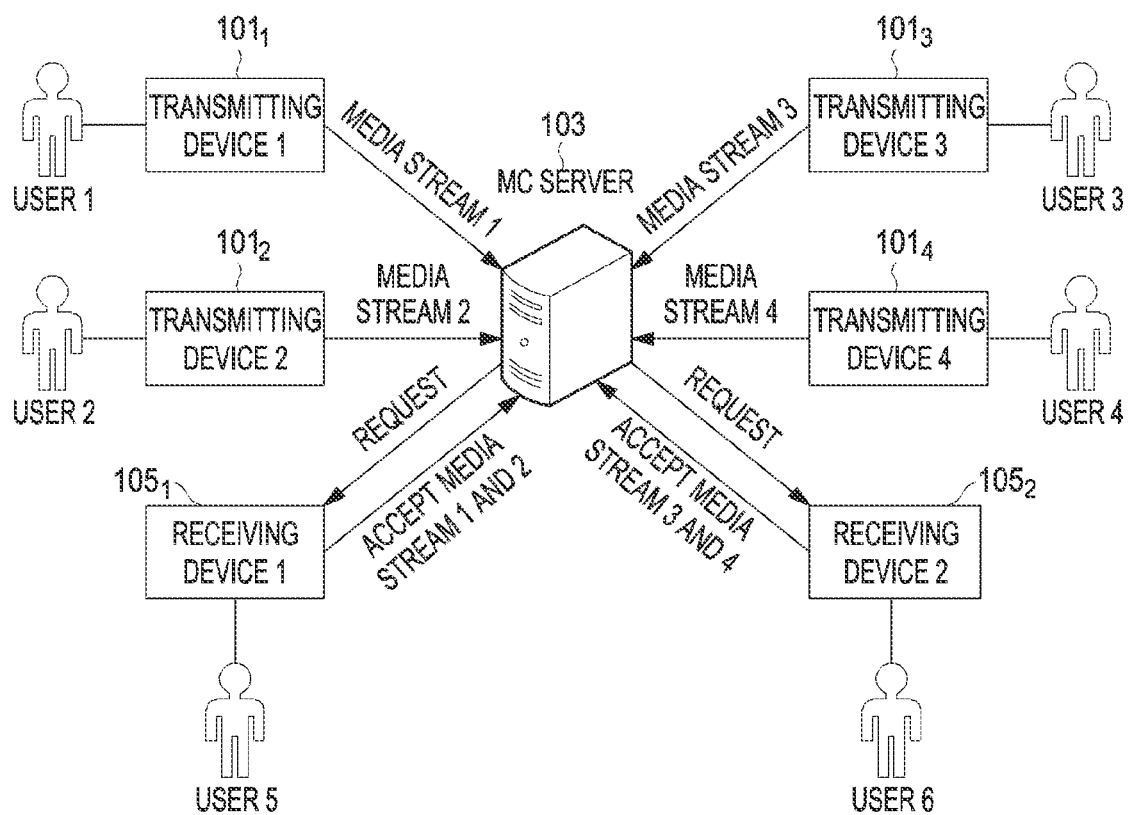
FIG. 2B illustrates handling reception of a plurality of media streams in an MC system, according to an embodiment.

FIG. 2B illustrates handling reception of a plurality of media streams in an MC system, according to an embodiment.

Referring to FIG. 2B, four transmitting devices 101 include transmitting device 1 $101_1$, transmitting device 2 $101_2$, transmitting device 3 $101_3$ and transmitting 4 $101_4$. Two receiving devices 105 include receiving device 1 $105_1$ and receiving device 2 $105_2$. The transmitting device 1 $101_1$ may be configured to transmit the media stream 1. Similarly, the transmitting device 2 $101_2$ may be configured to transmit media stream 2, transmitting device 3 $101_3$ may be configured to transmit media stream 3 $101_3$ and the transmitting device 4 $101_4$ may be configured to transmit the media stream 4. The MC server 103 may send a request to the receiving device 1 $105_1$ and the receiving 2 $105_2$ device, as shown in FIG. 2B.

Upon receiving the request, the receiving device 1 $105_1$ accepts the request to receive the media stream from transmitting device 1 $101_1$ and transmitting device 2 $101_2$. Therefore, the counter value for the receiving device 1 $105_1$ may be updated as "2", as the receiving device 1 $105_1$ has accepted to receive one media stream (media stream 1) from the transmitting device 1 $101_1$ and one media stream (media stream 2) from the transmitting device 2 $101_2$. Similarly, the receiving device 2 $105_2$ accepts the request to receive the media stream from transmitting device 3 $101_3$ and transmitting device 4 $101_4$. Therefore, the counter value for the receiving device 2 is updated as "2", as the receiving device 2 $105_2$, has accepted to receive one media stream (media stream 3) from the transmitting device 3 $101_3$ and one media stream (media stream 4) from the transmitting device 4 $101_4$.

The range of counter values can be set statically or dynamically. Range refers to the set of values between a maximum and minimum value of the counter. A group call range can be the same for all receiving devices 105 or it can be different for each of the one or more receiving devices 105. If the range is statically set, then counter values are fixed and will not change throughout the group call.

For example, for receiving device 1, counter max value is set to 2 in MC server 103 in a group call. Receiving device 1 can receive a maximum of two streams from transmitting device 101. If receiving device 1 tries to accept a third stream, then the third stream request will be rejected from MC server 103. The range of counter values is dynamically configured for each of the one or more receiving devices 105 based on parameters, which may include, but are not limited to, a type of receiving device, a priority of a user associated with the receiving device and the network load associated with the receiving device.

The range of counter values can change in between the group call for each of one or more receiving device. For example, the minimum counter value associated with the receiving device 1 $105_1$ is 0 and the maximum counter value associated with the receiving device 1 $105_1$ is 2. Further, the minimum counter value associated with the receiving device 2 $105_2$ is 0 and the maximum counter value associated with the receiving device 2 is 2. Therefore, the MC server 103 has rejected transmission of media streams from the transmitting device 3 $101_3$ and the transmitting device 4 $101_4$ to be received by receiving device 1 $105_1$ because the MC server 103 is already receiving the media stream from the transmitting device 1 $101_1$ and the transmitting device 2 $101_2$. In addition, the MC server 103 has rejected transmission of the media stream from the transmitting device 1 $101_1$ and the transmitting device 2 $101_2$ to the receiving device 2 $105_2$ because the MC server 103 is already receiving the media streams from the transmitting device 3 $101_3$ and the transmitting device 4 $101_4$.

The MC server 103 may decide the maximum and minimum counter values, and the counter values may be dynamically changed within the minimum counter value and the maximum counter value by the MC server 103 based on network condition/load, user information and device information. The counter value may be stored as counter value data 209. Table 1, below, may indicate the counter value for various device types, users, and network loads.

TABLE 1

| Device Type | User Type | Network Load | Counter Value |
| --- | --- | --- | --- |
| Mobile | Normal | High | 1 |
| Mobile | Normal | Medium | 2 |
| Mobile | Normal | Low | 4 |
| Mobile | Admin/Authorized | High | 2 |
| Mobile | Admin/Authorized | Medium | 4 |
| Mobile | Admin/Authorized | Low | 6 |
| Desktop | Normal | High | 2 |
| Desktop | Normal | Medium | 4 |
| Desktop | Normal | Low | 6 |
| Desktop | Admin/Authorized | High | 2 |
| Desktop | Admin/Authorized | Medium | 4 |
| Desktop | Admin/Authorized | Low | 8 |

Once the response is received from the receiving devices 105, the MC server 103, using the identification module 219, may identify the one or more receiving devices 105 in the group which is configured to receive the media streams from the transmitting devices 101 based on the SSRC identifier associated with the media streams of each of the one or more of the plurality of transmitting devices 101 and the counter value. Each media stream is associated with the SSRC identifier, which may be stored as SSRC identifier data 207.

Using the SSRC identifier, the MC server 103 may identify the receiving devices 105 which are configured to receive the intended media streams. The MC server 103 may identify the receiving device 1 for receiving the media streams from the transmitting device 1 and the transmitting device 2. The MC server 103 may identify the receiving device 2 for receiving the media stream from the transmitting device 3 and the transmitting device 4. Based on the mapped SSRC identifier and the counter value, the MC server 103 may transmit the media streams from the transmitting devices 101 to the receiving devices 105.

In the example above, the MC server 103 transmits the media streams from the transmitting device 1 and the transmitting device 2 to the receiving device 1, and transmits the media streams from the transmitting device 3 and the transmitting device 4 to the receiving device 2. The MC server 103 transmits the media streams to the receiving devices 105 until the receiving devices 105 rejects the request to receive the plurality of media streams from the transmitting devices 101. Additionally or alternatively, the receiving device 1 may reject the request to receive the media stream from the transmitting device 1. Therefore, the receiving device 1 may stop the media stream transmitting from the transmitting device 1. At this stage, the counter value may be updated to "1", as the receiving device 1 has rejected receiving the media stream from the transmitting device 1 but still is receiving a media stream from the transmitting device 2.

Further, the receiving device 1 may request the MC server 103 for re-initiating transmission of the media stream from the transmitting device 1. Upon receiving the request, the MC server 103 may check whether the transmitting device 1 is still transmitting the media stream. If the media stream is still being transmitted by the transmitting device 1, then the MC server 103 may transmit media stream from transmitting device 1 to the receiving device 1 and update the counter value accordingly. Therefore, the counter value may be updated based on the number of media streams accepted or rejected by each of the one or more receiving devices 105. In addition, the counter value for a particular receiving device may be incremented by 1 for each stream accepted by that device and decremented by 1 when a previously accepted stream is ended (or reception is refused) by that particular receiving device. The counter value indicates the active receiving stream count for a particular receiving device. When any of the transmitting devices 101 terminate transmission of the plurality of media streams, the MC server 103 transmits a notification message to the receiving devices 105 in the group, and the counter value will be decremented by 1 for one or more active receiving devices 105.

The present disclosure provides two solutions for the MC server 103 to handle multiple media streams in a single group communication problem, the first solution uses a reception controller state and state machine to handle complexities for multiple stream scenarios. The second solution uses a counter and a state machine transaction at the MC server 103 to handle such complexities.

Figure 3:
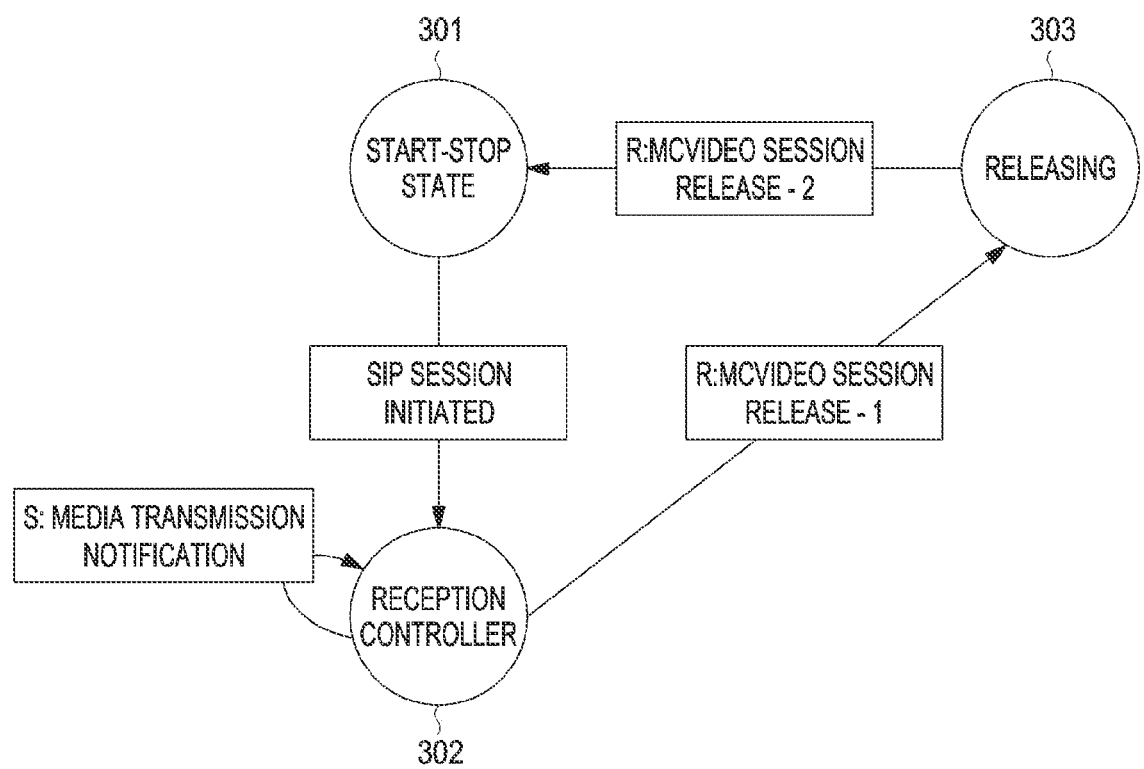
FIG. 3 illustrates a state diagram of a method of using a reception controller state and server state machines for handling reception of a plurality of media streams in an MC system, according to an embodiment.
Figure 4:
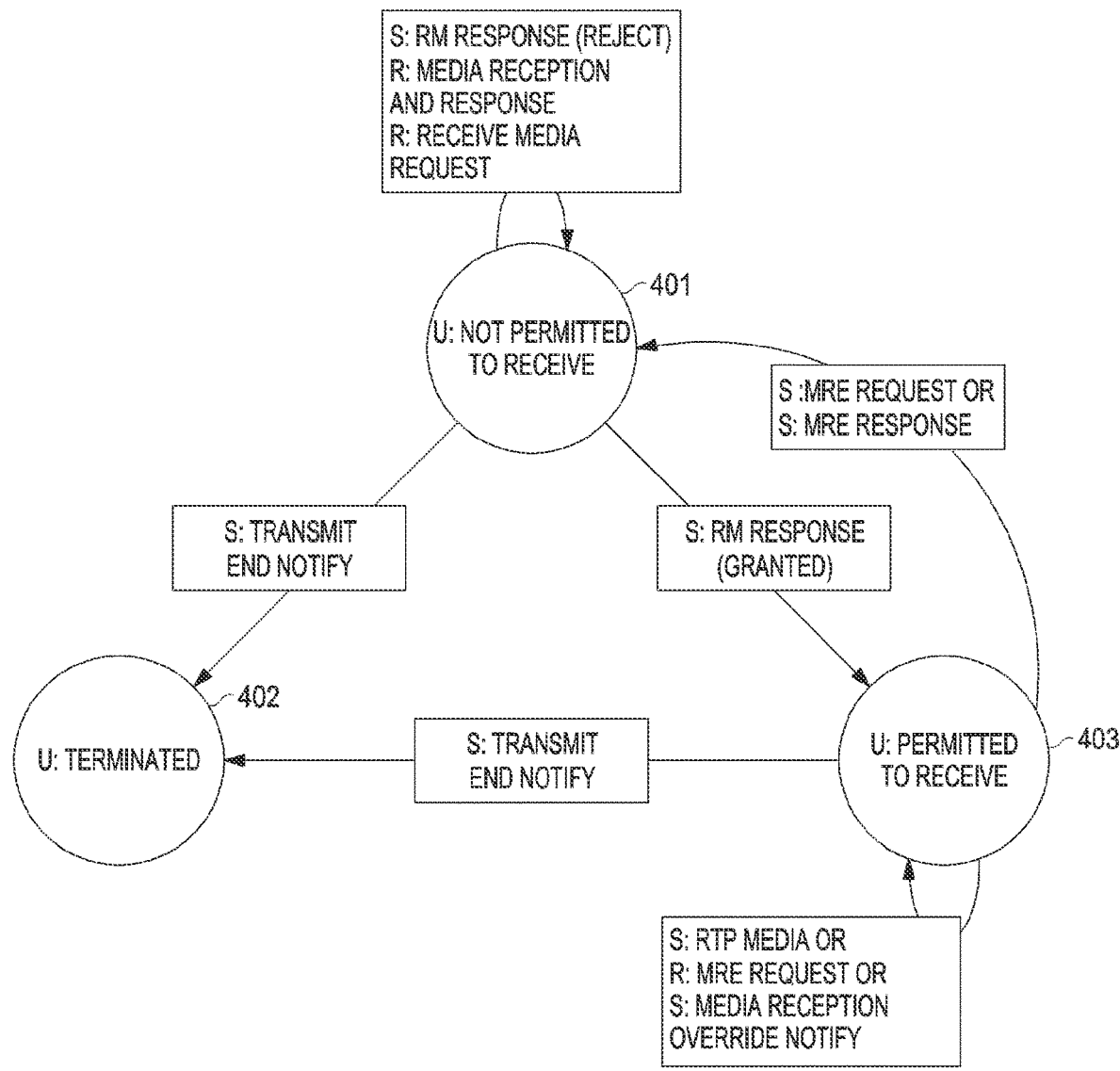
FIG. 4 illustrates a state diagram of a method of using a reception controller state and server state machines for handling reception of a plurality of media streams in an MC system, according to an embodiment.

FIGS. 3-4 illustrate state diagrams of methods of using a reception controller state and server state machines for handling reception of a plurality of media streams in an MC system, according to various embodiments.

In particular. FIG. 3 illustrates a state diagram for "transmission control server, basic reception control operation towards the transmission participant". FIG. 4 shows the state diagram for "transmission control server stream reception control operation towards the transmission participant". The reception control arbitration logic in the MC server 103 shall keep one instance of the "basic reception control operation towards the transmission participant" state machine per user associated with the receiving devices 105, and shall create one instance of the "stream reception control operation towards the transmission participant" state machine for each media transmission notification message sent to the user.

The reception control interface towards the MCVideo client in the transmission control server (e.g., the MC server 103) shall create one instance of the "basic reception control operations" state machine towards the MCVideo client for every transmission participant served by the MC server 103, and shall create one instance of the "stream reception control operation towards the transmission participant" state machine for each "media transmission notification message" 301 received from reception control arbitration logic.

Referring to FIG. 3, at "start-stop" state 301, this state is part of the MC server 103. When a new instance of the "basic reception control operations towards the transmission participant" state machine is created, before any reception control related input is applied, the state machine is in the "start-stop" state 301. Similarly, when the call is released the state machine shall return to the "start-stop" state 301. An association between the MC server 103 and a transmission participant in the MCVideo client is created when the state machine is created; and when one of the following two (2) events occur:

1. in case of an originating MCVideo call, when the MC server 103 transmits the session initiation protocol (SIP) 200 (OK) response to the originating MCVideo client; and 2. in case of a terminating MCVideo call, when the MC server 103 receives the SIP 200 (OK) response sent from the terminating MCVideo client.

When the SIP Session is established and if the session is a normal group call session, then if an MCVideo client initiates an MCVideo call, and the MCVideo call does not exist yet, the transmission control interface towards the MCVideo client in the MC server 103 shall initialize a general state machine; or shall enter into a "reception controller" state 302. If the associated transmission participant attempts to initiate an already existing MCVideo call or an MCVideo client rejoins an ongoing MCVideo call or if the MCVideo client is invited to the MCVideo call, then if no MCVideo client has the permission to send media, the transmission control interface towards the MCVideo client in the MC server 103 shall create a "basic reception control operations towards the transmission participant" state machine or shall enter into a "reception controller" state 302.

If other MCVideo clients have permission to send a media, the transmission control interface towards the MCVideo client in the MC server 103 shall create "basic reception control operations towards the transmission participant" state machine and enter into a "reception controller" state 302; or shall send a media transmission notification to the participant.

The "releasing" state 303 is part of the MC server 103 "basic reception control operation towards the transmission participant" state machine. The reception control interface towards the MCVideo client in the MC server 103 uses this state while waiting for the application and signaling plane to finalize the release of the MCVideo call or finalizing the removal of the MCVideo client from the MCVideo call.

Further, upon receiving an MCVideo call release request from the application and signaling plane, the reception control interface towards the MCVideo client in the MC server 103 shall request the network media interface to release all resources associated with this MCVideo client for this MCVideo call; shall terminate all "stream reception control operation towards the transmission participant" state machine instances associated with transmission participant; and shall enter the "start-stop" state 301 and terminate the "basic reception control operation towards the transmission participant" state machine associated with this transmission participant.

In the "reception controller" state 302, this part of the MC server 103 state is transitioned for the "basic reception control operation towards transmission participant" state machine. The MC server 103 is in this state to handle transmission notification messages received from reception control arbitration logic. All reception control messages targeted for a particular transmission participant first received in this state and later for further processing received messages will be diverted to a corresponding "stream reception control" state machine based on "User ID and the SSRC" of user transmitting the media streams.

When the MC server 103 server has received real time protocol (RTP) media packets from another transmission participant, or upon receiving a media transmission notification message from the reception control arbitration logic, the reception control interface towards the MCVideo client in the MC server 103 shall send the media transmission notification message to the transmission participant; shall include the user ID and the SSRC of the user transmitting the media in the media transmission notification message, may set the first bit in the subtype of the media transmission notification message to "1" (acknowledgment is required); initiate an instance of a "stream reception control operations towards the transmission participant" state machine; shall map the stored User ID and the SSRC of the user transmitting the media with an instance of "stream reception control operations towards the transmission participant"; and shall remain in the "reception controller" state 302.

In the "U: not permitted to receive" state 401, as shown in FIG. 4, this state is part of the MC server 103 "stream reception control operation towards the transmission participant" state machine, the transmission control interface towards the MCVideo client in the MC server 103 uses this state when the associated transmission participant is not permitted to receive media and is waiting for the response to a transmission notification message.

Referring to FIG. 4, upon receiving the "media reception end response message" from the transmission participant, the transmission control interface towards the MCVideo client in the MC server 103 shall remain in "U: not permitted to receive" state 401.

In the "U: not permitted to receive" state 401, upon receiving a "receive media request message" from the associated transmission participant, the transmission control interface towards the MCVideo client in the MC server 103 shall, if the session is not a broadcast group call, forward the receive media request message to the reception control server arbitration logic; and if the reception control server arbitration logic decides that the transmission participant cannot receive media, send a receive media response (Rejected) message to the associated transmission participant. The receive media response (Rejected) message shall include in the result field the <Result indicator> value result #0 (Rejected) and shall include in the reject cause field the <Reject Cause> value: cause #0 (Insufficient downlink bandwidth); or cause #1 (No permission to receive).

The receive media response (Rejected message may include, in the reject cause field, an additional text string explaining the reason for rejecting the transmission request in the <Reject Phrase> value; may set the first bit in the subtype of the transmission response (Rejected) message to "1" (acknowledgment is required); if a group call is a broadcast group call, a system call, an emergency call, an imminent peril call, or a temporary group session, shall include the transmission indicator field with appropriate indications, and shall remain in a "U: not permitted to receive" state.

In the "U: not permitted to receive" state 401, upon receiving a "receive media request message" from the associated transmission participant including a reception priority field, the reception priority shall be the lower than the reception priority included in receive media request message and the negotiated maximum reception priority that the MCVideo client is permitted to request.

In the "U: not permitted to receive" state 401, when the MC server 103 has stopped receiving media streams from another transmission participant on an uplink, the reception transmission control interface towards the MCVideo client in the MC server 103 shall send the transmission end notify message to the transmission participant; shall include the SSRC of the user transmitting the media in the transmission end notify message; and shall enter "U: terminated" state 402.

In the "U: not permitted to receive" state 401, reception control arbitration logic in the MCVideo server decides to grant permission to the transmission participant to receive the media, the transmission control interface towards the MCVideo client in the transmission control server shall send the receive media response (Granted) message to the associated transmission participant, and shall enter the "U: permitted to receive" state 403.

The "U: permitted to receive" state 403 is part of the MC server 103 "stream reception control operation towards the transmission participant" state machine. The reception transmission control interface towards the MCVideo client in the MC server 103 uses this state when the associated transmission participant has been given permission to receive media streams.

In the "U: permitted to receive" state 403, when transmission control server has stopped receiving RTP media packets from another transmission participant on an uplink, the reception transmission control interface towards the MCVideo client in the MC server 103 shall send the transmission end notify message to the transmission participant; shall include the SSRC of the user transmitting the media in the transmission end notify message; and shall enter "U: terminated" state 402.

In the "U: permitted to receive" state 403, when the MC server 103 determines to end sending the RTP media packets on a downlink to the transmission participant, the reception control interface towards the MCVideo client in the MC server 103 shall stop sending the media streams to the transmission participant; shall send the media reception end response message to the transmission participant, and may set the first bit in the subtype of the media reception end response message to "1"; and shall enter into a "U: not permitted to receive" state 401.

The "U: terminated" is part of the MC server 103 "stream reception control operation towards the transmission participant" state machine. Upon entering this state, the MC server 103 shall release any downlink resources associated with the transmission participant's stream; shall delete the instance of this "stream reception control operation towards the transmission participant" state machine; and, if the session was initiated as a broadcast group call, shall indicate a "MC server 103 basic reception control operation towards the transmission participant" state machine to move to a "releasing" state.

Figure 5:
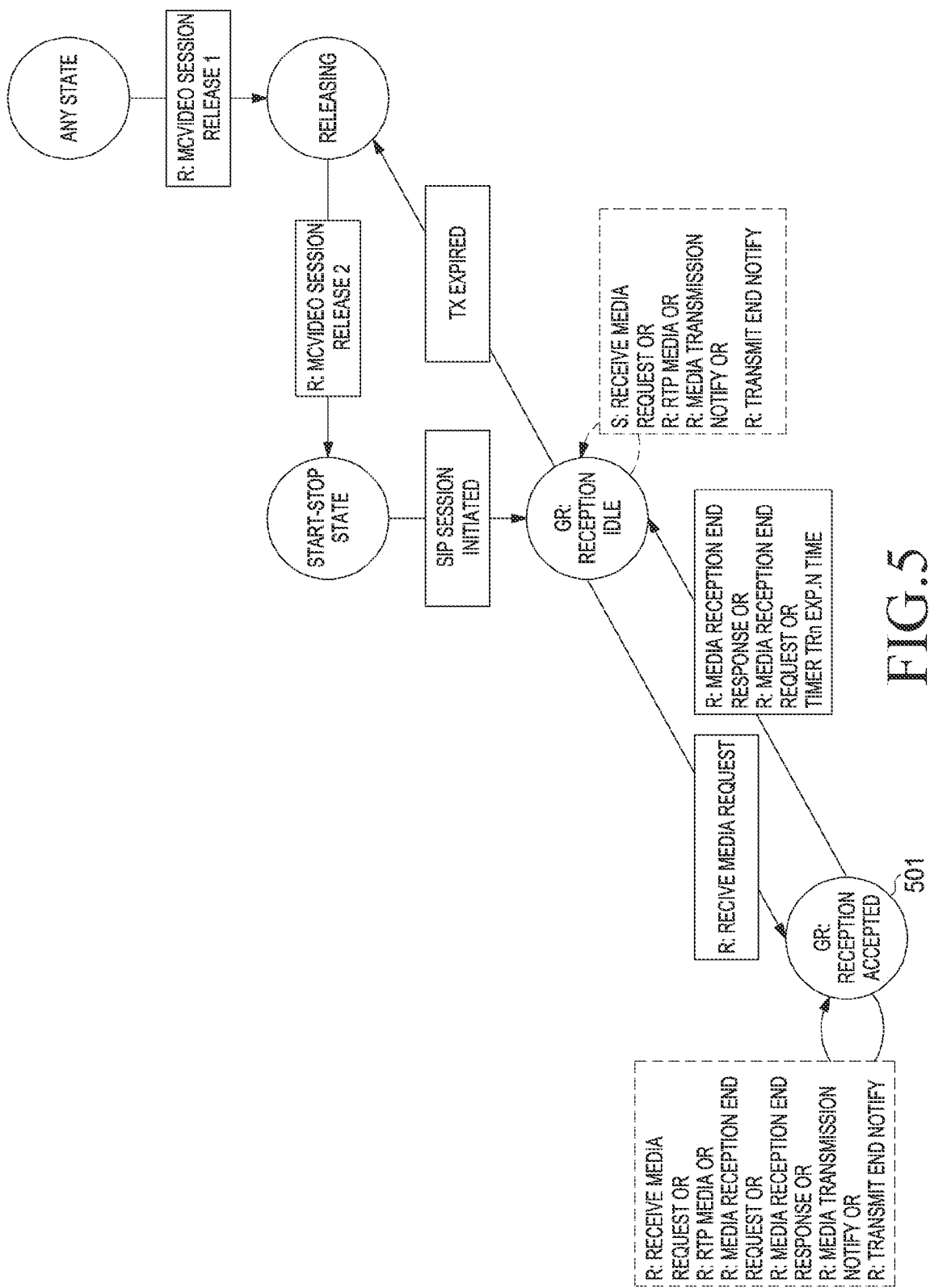
FIG. 5 illustrates a state diagram of a method of using counter and server state transitions for handling reception of multiple media streams by the MC server, according to an embodiment.
Figure 6:
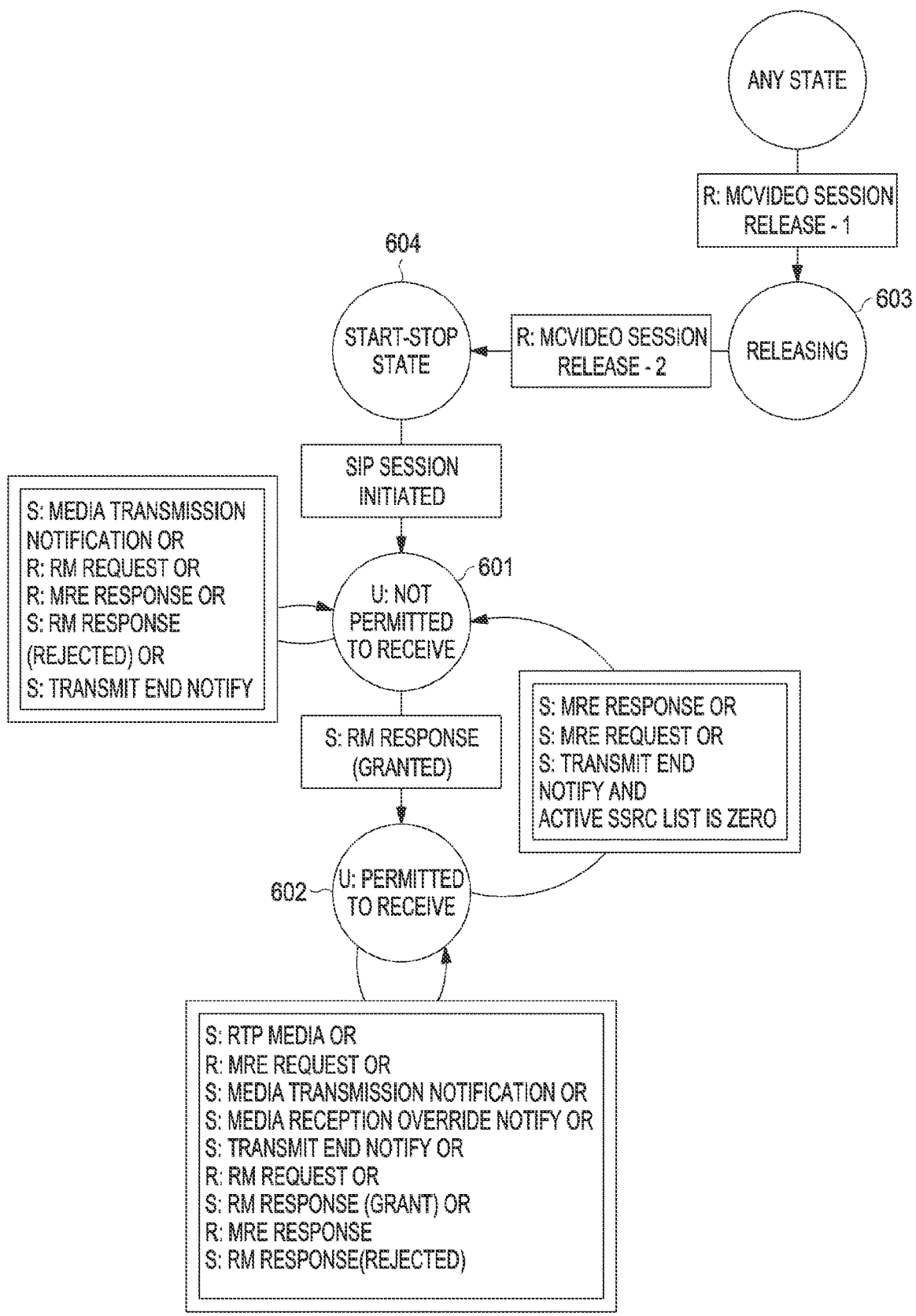
FIG. 6 illustrates a state diagram of a method of using counter and server state transitions for handling reception of multiple media streams by the MC server, according to an embodiment.

FIGS. 5-6 illustrate state diagrams of methods of using counter and server state transitions for handling reception of multiple media streams by the MC server, according to various embodiments.

The reception control arbitration logic in the MC server 103 shall keep one instance of the "general transmission control operation" state machine per MCVideo call and shall keep one instance of the "basic reception control operations" state machine towards the MCVideo client for every transmission participant served by the MC server 103.

Referring to FIGS. 5-6, the "Gr: reception accepted" state 501 is part of MC server 103 general reception control operation state machine.

In the "Gr: reception accepted" state 501, upon receiving a media transmission request notify message from the reception control arbitration logic in the MC server 103, the MC server 103 shall send the media transmission notify message to all other transmission participants. If a group call is a broadcast group call, system call, emergency call, an imminent peril call, the media transmission notify message shall include the reception mode with the reception mode field set to "0" to indicate an automatic reception mode. If a group call is not a broadcast group call, system call, emergency call or an imminent peril call, the media transmission notify message shall include the reception mode with the reception mode field set to "1" to indicate a manual reception mode. In addition, the MC server 103 shall remain in the "Gr: reception accepted" state 501.

When an SIP Session is established and if the session is a normal group call session, then if an MCVideo client initiates an MCVideo call, and the MCVideo call does not exist yet, the transmission control interface towards the MCVideo client in the MC server 103 shall initialize a general state machine, and shall enter the "U: not permitted to receive" state 601.

If the associated transmission participant attempts to initiate an already existing MCVideo call, an MCVideo client rejoins an ongoing MCVideo call, or if the MCVideo client is invited to the MCVideo call, then if no MCVideo client has the permission to send media, the transmission control interface towards the MCVideo client in the MC server 103 shall enter the "U: not permitted to receive" state 601. On the other hand, if other MCVideo clients have permission to send media, the transmission control interface towards the MCVideo client in the MC server 103 shall enter the "U: not permitted to receive" state 601, and shall send a media transmission notification.

The "U: not permitted to receive" state 601 is part of MC server 103 basic reception control operation state machine. The transmission control interface towards the MCVideo client in the MC server 103 uses this state when the associated transmission participant is not permitted to receive media streams. When entering the "U: not permitted to receive" state 601, the transmission control interface towards the MCVideo client in the MC server 103 shall set the state for the associated transmission participant to "U: not permitted to receive"; shall initialize the counter value (herein referred to as C9) (Reception Active) to 0; and shall empty the active SSRC list.

In the "U: not permitted to receive" state 601, when the MC server 103 has received media packets from another transmission participant or upon receiving a media transmission notification message from the reception control arbitration logic, the transmission control interface towards the MCVideo client in the MC server 103 shall send the media transmission notification message to the transmission participant; shall include the user ID and the SSRC of a user transmitting the media in the media transmission notification message; and shall remain in the "U: not permitted to receive" state 601. In addition, transmission control interface towards the MCVideo client in the MC server 103 may set the first bit in the subtype of the media transmission notification message to "1" (Acknowledgment is required). Additionally, the receipt of the transmission control Ack message and what action to take if the transmission control Ack message is not received may be adjusted.

In the "U: not permitted to receive" state, when the reception MC server 103 arbitration logic in the MCVideo server decides to grant permission to the transmission participant to receive the media, the transmission control interface towards the MCVideo client in the MC server 103 shall send the receive media response (Granted) message to the associated transmission participant; shall increase counter C9 value by 1 if it has not reached its upper limit; shall store the SSRC of transmission participant granting the permission to send media in the active SSRC list until the associated transmission is ended towards participant; and shall enter the "U: permitted to receive state. In addition, the transmission control interface towards the MCVideo client in the MC server 103 may set the first bit in the subtype of the receive media response (Granted) message to "1" (Acknowledgment is required).

In the "U: not permitted to receive" state 601, when MC server 103 has stopped receiving media stream from another transmission participant on an uplink, or upon receiving a transmission end notify message from the reception control arbitration logic, the transmission control interface towards the MCVideo client in the MC server 103 shall send the transmission end notify message to the transmission participant; shall include the SSRC of the user transmitting the media in the transmission end notify message; and shall remain in the "U: not permitted to receive" state 601.

The "U: permitted to receive" state 602 is part of MC server 103 basic reception control operation state machine. The MC server 103 uses this state when the associated transmission participant has been given permission to receive media. When entering this state, the transmission control interface towards the MCVideo client in the MC server 103 shall set the state for the associated transmission participant to "U: permitted to receive".

In the "U: permitted to receive" 602 state, upon the decision of the reception control arbitration logic to permit the transmission participant to receive a media in transmission, the transmission control interface towards the MCVideo client in the MC server 103 shall request the network media interface in the MCVideo server to forward media stream to the media distributor in the MCVideo server if received packet SSRC is present in the active SSRC list; shall discard the RTP media packets if received packet SSRC is not in the active SSRC list; and shall remain in the "U: permitted to receive" state 602.

In the "U: permitted to receive" state 602, when the MC server 103 has received a media stream from another transmission participant on an uplink or upon receiving a media transmission notification message from the reception control arbitration logic, the transmission control interface towards the MCVideo client in the MC server 103 shall send the media transmission notification message to the transmission participant; shall include the user ID and the SSRC of user transmitting the media in the media transmission notification; and shall remain in the "U: permitted to receive" state 602.

In the "U: permitted to receive" state 602, when MC server 103 has stopped receiving media streams from another transmission participant on an uplink, the transmission control interface towards the MCVideo client in the MC server 103 shall send the transmission end notify message to the transmission participant; shall include the SSRC of the user transmitting the media in the transmission end notify message; and shall remove SSRC of the user transmitting the media from Active SSRC list. In addition, if SSRC of the user transmitting the media present in an active SSRC list, then the counter C9 shall be decreased by a value of 1 if it has not reached its lower limit. Additionally, if counter C9 value has not reached its lower limit, the transmission control interface towards the MCVideo client in the MC server 103 shall remain in the "U: permitted to receive" state 602. In addition, if the counter C9 value has reached it lower limit, the transmission control interface towards the MCVideo client in the MC server 103 shall enter the "U: not permitted to receive" state 601.

In the "U: permitted to receive" state 602, when the MC server 103 determines to end sending the RTP media packets on a downlink to the transmission participant, the transmission control interface towards the MCVideo client in the MC server 103 shall stop sending the media streams to the transmission participant; shall send the media reception end request message to the transmission participant; shall include the SSRC of the user transmitting the media in the media reception end request message; and shall remove SSRC of the user transmitting the media from Active SSRC list. If the SSRC of the user transmitting the media is present in the active SSRC list, then the transmission control interface towards the MCVideo client in the MC server 103 shall decrease the counter C9 value (Reception Active) by 1 if it has not reached its lower limit. In addition, if the counter C9 value has not reached its lower limit, the transmission control interface towards the MCVideo client in the MC server 103 shall remain in the "U: permitted to receive" state 602. Additionally, if the counter C9 value has reached its lower limit, the transmission control interface towards the MCVideo client in the MC server 103 shall enter the "U: not permitted to receive" state 601.

In the "U: permitted to receive" state 602, when the MC server 103 determines to end sending the RTP media packets on a downlink to the transmission participant, the transmission control interface towards the MCVideo client in the MC server 103 shall stop sending the media stream to the transmission participant; shall send the media reception end response message to the transmission participant, and may set the first bit in the subtype of the media reception end response message to "1" (Acknowledgment is required); and shall remove the SSRC of the user transmitting the media from the active SSRC list. If the SSRC of the user transmitting the media is present in Active SSRC list, then the transmission control interface towards the MCVideo client in the MC server 103 shall decrease the counter C9 (Reception Active) value by 1 if it has not reached its lower limit. In addition, if the counter C9 value has not reached it lower limit, the transmission control interface towards the MCVideo client in the MC server 103 shall remain in the "U: permitted to receive" state 602. Additionally, if the counter C9 value has reached its lower limit, the transmission control interface towards the MCVideo client in the MC server 103 shall enter the "U: not permitted to receive" state 601.

In the "U: permitted to receive" state 602, upon receiving a receive media request message from the associated transmission participant, the transmission control interface towards the MCVideo client in the MC server 103 shall reject the request if the counter C9 value (Reception Active) has reached its upper limit, and shall skip the forwarding of a receive media request message to the reception control server arbitration logic. If the session is not a broadcast group call, the transmission control interface towards the MCVideo client in the MC server 103 shall forward the receive media request message to the reception control server arbitration logic. In addition, if the reception control server arbitration logic decides that the transmission participant cannot receive media, the transmission control interface towards the MCVideo client in the MC server 103 shall send a receive media response (Rejected) message to the associated transmission participant.

The receive media response (Rejected) message shall include, in the result field, the <Result indicator> value, result #0 (Rejected); and shall include, in the reject cause field, the <Reject Cause> value cause #0 (Insufficient downlink bandwidth), cause #1 (No permission to receive), or cause #7 (Max number of simultaneous streams that can be received is reached). In addition, the receive media response (Rejected) message may include, in the reject cause field, an additional text string explaining the reason for rejecting the transmission request in the <Reject Phrase> value. Additionally, the receive media response (Rejected) message may set the first bit in the subtype of the transmission response (Rejected) message to "1" (Acknowledgment is required). In addition, if a group call is a broadcast group call, a system call, an emergency call, an imminent peril call, or a temporary group session, the receive media response (Rejected) message shall include the transmission indicator field with appropriate indications.

Additionally, the transmission control interface towards the MCVideo client in the MC server 103 shall remain in the "U: permitted to receive" state 602.

Upon receiving a receive media request message from the associated transmission participant including a reception priority field, the reception priority shall be lower than the reception priority included in a receive media request message and the negotiated maximum reception priority that the MCVideo client is permitted to request.

In the "U: permitted to receive" state 602, when the reception control server arbitration logic in the MCVideo server decides to grant permission to the transmission participant to receive the media, the transmission control interface towards the MCVideo client in the MC server 103 shall send the receive media response (Granted) message to the associated transmission participant; shall increase counter C9 value (Reception Active) by 1 if it has not reached its upper limit; shall store the SSRC of a transmission participant granting the permission to send media in the active SSRC list until the participant's associated transmission is ended; and shall remain in the "U: permitted to receive" state 602. In addition, the transmission control interface towards the MCVideo client in the server 103 may set the first bit in the subtype of the receive media response (Granted) message to "1" (Acknowledgment is required).

In the "U: permitted to receive" state 602, upon receiving the media reception end response message from the transmission participant, the transmission control interface towards the MCVideo client in the MC server 103 shall release any downlink resources associated with the requested media reception for the transmission participant; and shall remain in the "U: permitted to receive" state 602.

The "releasing" state 603 is part of the transmission control server "basic reception control operation towards the transmission participant" state machine. The reception control interface towards the MCVideo client in the MC server 103 uses this state while waiting for the application and signaling plane to finalize the release of the MCVideo call or finalize the removal of the MCVideo client from the MCVideo call.

Upon receiving an MCVideo call release request from the application and signaling plane, the reception control interface towards the MCVideo client in the MC server 103, shall request the network media interface to release all resources associated with this MCVideo client for this MCVideo call; and shall enter the "Start-stop" state 604 and terminate the "basic reception control operation towards the transmission participant" state machine associated with this transmission participant.

When a maximum number of media stream to receive is reached for a receiving device 105, the <Reject cause> value is set to "7", which indicates that the MC server 103 cannot grant the receive media request due to a maximum number of simultaneous received streams having been reached.

A C9 (active reception per-participant) counter is used in MC server 101. The MC server 101 stores a count of a plurality of streams accepted by a particular receiving device for a group call. Table 2, below, provides additional details of the C9 counter.

TABLE 2

| Counter | Limit | Associated timer | On reaching the limit |
|---|---|---|---|
| C9 (Active Reception Per-Participant) | Default value: 4 Configurable. Obtained from the <C9-per-participant-reception-accepted> element of the <fc-timers-counters> element of the <on-network> | None | Receive media requests from transmission participant is rejected. |

Figure 7:
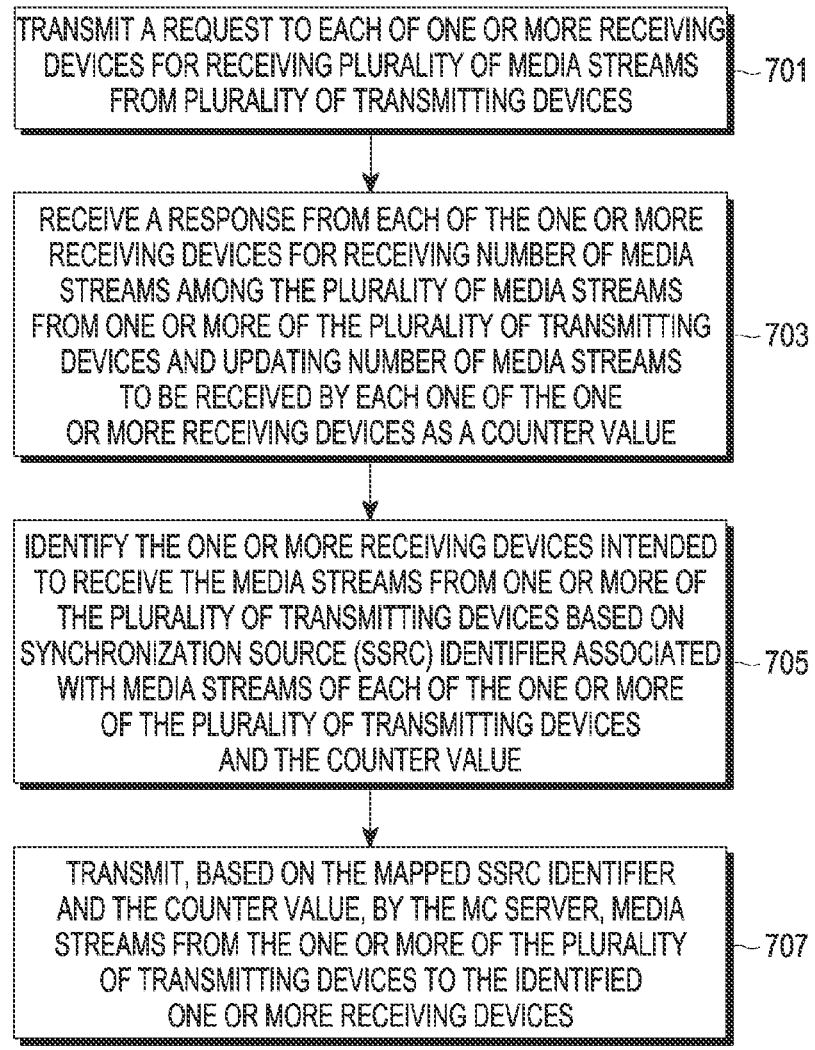
FIG. 7 illustrates a flowchart of a method for handling reception of a plurality of media streams in an MC system, according to an embodiment.

FIG. 7 illustrates a flowchart of a method for handling reception of a plurality of media streams in an MC system, according to an embodiment of the present disclosure.

Referring to FIG. 7, the method includes one or more blocks illustrating a method for handling reception of a plurality of media streams at an MC server 103. The method may be described in the general context of computer executable instructions. Generally, computer executable instructions can include routines, programs, objects, components, data structures, procedures, modules, and functions, which perform specific functions or implement specific abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 701, the MC server 103 transmits a request to each of one or more receiving devices 105 for receiving a plurality of media streams sent from the plurality of transmitting devices 101.

At step 703, the MC server 103 receives a response from each of the one or more receiving devices 105 for receiving a number of media among the plurality of media streams from one or more of the plurality of transmitting devices 101, and updates a number of media streams to be received by each of the one or more receiving devices 105 as a counter value.

The counter value may be a numerical value which is updated based on number of media streams accepted or rejected by each of the one or more receiving devices 105. The counter value may be incremented by 1 for each media stream accepted by the receiving device 105 and decremented by 1 when a previously accepted media stream is ended by the receiving device 105. In addition, if the receiving device 105 accepts a request to receive two media streams from the transmitting devices 101, then the counter value may be 2. If the receiving device later rejects the request to receive the media stream from one of the transmitting device 101 which was accepted earlier, then the counter value may be updated to 1.

At step 705, the MC server 103 identifies the one or more receiving devices 105 intended to receive the media streams from one or more of the plurality of transmitting devices 101 based on an SSRC identifier associated with media streams of each of the one or more of the plurality of transmitting devices 101 and the counter value.

At step 707, the MC server 103 transmits media streams from the one or more of the plurality of transmitting devices 101 to the identified one or more receiving devices 105 based on the mapped SSRC identifier and the counter value.

The MC server 103 may receive a reception end request from one or more receiving devices 105 when the one or more receiving devices 105 do not want to receive a media stream from transmitting devices 101. The MC server 103 may update the counter value and send a response to the one or more receiving devices 105. The MC server may stop forwarding media streams from transmitting devices 101 to the one or more receiving devices 105 who ended reception.

The MC server 103 may receive a request, from the receiving devices 105, to receive a media stream from each of the one or more transmitting devices 101 for the receiving devices 105 that ended media reception earlier by sending a reception end request message to the MC server 103.

The MC server 103 may transmit an end notification to the receiving devices 105 when media transmission from the transmitting devices 101 has ended.

Figure 8:
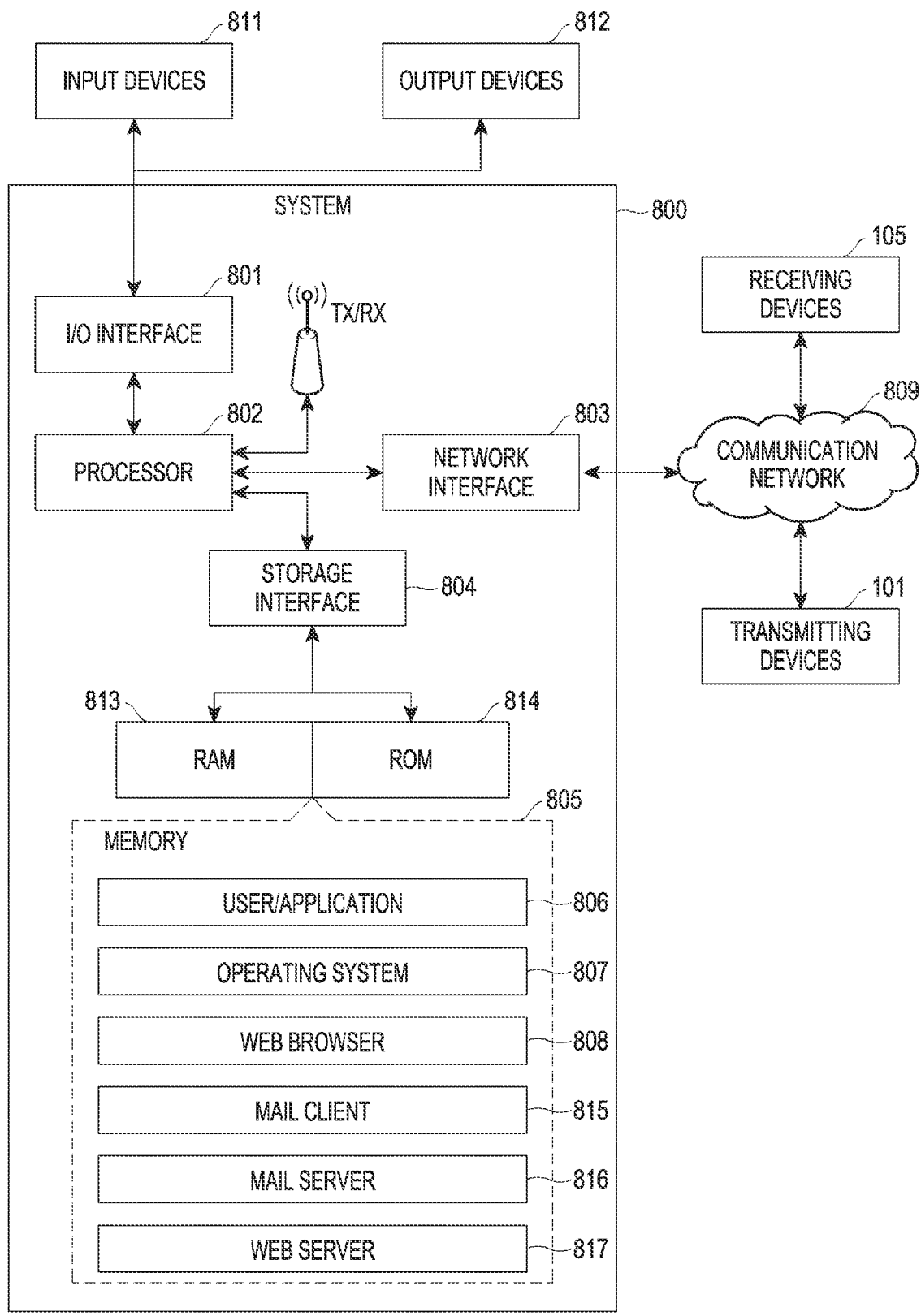
FIG. 8 illustrates a block diagram of a computer system, according to an embodiment.

FIG. 8 illustrates a block diagram of a computer system, according to an embodiment.

Referring to FIG. 8, the computer system 800 may be an MC server 103. The computer system 800 includes a central processing unit 802 ("CPU" or "processor"). The processor 802 may comprise at least one data processor for executing program components for executing user or system-generated business processes. The processor 802 may include specialized processing units such as integrated system (bus) controllers, memory management control units, floating point units, graphics processing units, and digital signal processing units.

The processor 802 may be disposed in communication with one or more input/output (I/O) devices, such as input device 811 and output device 812, via I/O interface 801. The I/O interface 801 may employ communication protocols/methods such as, without limitation, audio, analog, digital, stereo, the Institute of Electrical and Electronics Engineers (IEEE)-1394, serial bus, universal serial bus (USB), infrared, personal system (PS)/2, bayonet Neill-Concelman (BNC), coaxial, component, composite, digital visual interface (DVI), high-definition multimedia interface (HDMI), radio frequency (RF) antennas, S-Video, video graphics array (VGA), IEEE 802.n/b/g/n/x, Bluetooth, and cellular (e.g., code-division multiple access (CDMA), High-speed packet access (HSPA+), global system for mobile communications (GSM), and long-term evolution (LTE)). Using the I/O interface 801, the computer system 800 may communicate with the input device 811 and/or the output device 812.

The processor 802 may be disposed in communication with a communication network 809 via a network interface 803. The network interface 803 may communicate with the communication network 809. The network interface 803 may employ connection protocols including, without limitation, direct connect, ethernet (e.g., twisted pair 10/100/1000 Base T), transmission control protocol/internet protocol (TCP/IP), token ring, and IEEE 802.11a/b/g/n/x.

The communication network 809 can be implemented as one of the several types of networks, such as intranet or local area network (LAN) within the organization. The communication network 809 may either be a dedicated network or a shared network, which represents an association of several types of networks that use a variety of protocols, such as hypertext transfer protocol (HTTP), TCP/IP, and wireless application protocol (WAP), to communicate with each other. Further, the communication network 809 may include a variety of network devices, including routers, bridges, servers, computing devices, and storage devices.

The processor 802 may be disposed in communication with a memory 805 including a random access memory (RAM) 813 or a read only memory (ROM) 814 via a storage interface 804. The storage interface 804 may connect to memory 805 including, without limitation, memory drives and removable disc drives employing connection protocols such as serial advanced technology attachment (SATA), integrated drive electronics (IDE), IEEE-1394, USB, fiber channel, and small computer systems interface (SCSI). The memory drives may further include a drum, magnetic disc drive, magneto-optical drive, optical drive, redundant array of independent discs (RAID), solid-state memory devices, and solid-state drives.

The memory 805 may store a collection of program or database components, including, without limitation, a user/application data 806, an operating system 807, a web browser 808, a mail client 815, a mail server 816, and a web server 817. In some embodiments, computer system 800 may store user/application data 806 including variables, and records. Such databases may be implemented as fault-tolerant, relational, scalable, secure databases such as Oracle® or Sybase®.

The operating system 807 may facilitate resource management and operation of the computer system 800. Examples of operating systems 807 include, without limitation, Apple Macintosh® operating system (OS) X, UNIX®, UNIX-like system distributions (e.g., Berkeley Software Distribution™ (BSD), FreeBSD™, NetBSD™, and OpenBSD™), Linux Distributions™ (e.g., Red Hat™, Ubuntu™, Kubuntu™, etc.), IBM™ OS/2, Microsoft™ Windows™ (XP™, Vista™/7/8, 10 etc.), Apple® IOS™, Google® Android™, and Blackberry® OS. A user interface may facilitate display, execution, interaction, manipulation, or operation of program components through textual or graphical facilities. User interfaces may provide computer interaction interface elements on a display system operatively connected to the computer system 800, such as cursors, icons, check boxes, menus, windows, and widgets. Graphical user interfaces (GUIs) may be employed, including, without limitation, Apple Macintosh® OSs, IBM™ OS/2, Microsoft™ Windows™ (XP™, VISTA™/7/8, and 10), Unix® X-Windows, and web interface libraries (e.g., Ajax™, DHTML™, Adobe® Flash™, Javascript™, and Java™).

Furthermore, one or more computer-readable storage media may be utilized in implementing embodiments consistent with the present application. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples of computer-readable storage media include RAM, ROM, volatile memory, nonvolatile memory, hard drives, compact disc (CD) ROMs, Digital Video Disc (DVDs), flash drives, disks, and any other known physical storage media.

Accordingly, the present disclosure provides an MC server that effectively configures and controls a number of media streams which can be sent to a particular user dynamically. The MC server starts forwarding the media streams to a receiving device based on a counter value, an SSRC identifier and a user's stream selection.

As discussed above, new state transitions and counter values may be introduced at the MC server to handle the transmission of multiple media streams to a recipient device. Therefore, the present disclosure provides a method and system for handling the reception of a plurality of media streams at a media controller. Thus, the present disclosure provides flexibility for the user to accept the plurality of media streams and to terminate any media stream at any time. Also, the present disclosure provides flexibility to start (or restart) reception of a media stream from an MC server for a media stream which user rejected or ended earlier. The MC server manages the media stream such that the user can accept and terminate reception at any time, and also forwards the media stream to the intended recipient only. The server forwards the media stream only to a recipient device that accepted the stream, and terminates reception by sending a message to the MC server upon request of the recipient device. When the MC server receives the request, the MC server stops sending the media stream to that particular recipient device. Accordingly, the present disclosure avoids complications in handling media streams.

The terms "an embodiment", "embodiment", "embodiments". "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, more than one device/article (e.g., if they cooperate) may be used in place of a single device/article. Similarly, where more than one device or article is described herein (e.g., if they cooperate), a single device/article may be used in place of the more than one device or article or a different number of devices/articles may be used instead of the shown number of devices or programs. The functionality and/or features of a device may be alternatively embodied by one or more other devices which are not explicitly described as having such functionality/features. Thus, other embodiments of the disclosure need not include the device itself.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for handling reception of a plurality of media streams in a mission critical (MC) system, the method comprising:
   transmitting, by an MC server, a request to each of one or more receiving devices for receiving a plurality of media streams from a plurality of transmitting devices;
   receiving, by the MC server, a response from each one of the one or more receiving devices for receiving a number of media streams among the plurality of media streams transmitted by the one or more of the plurality of transmitting devices and updating the number of media streams to be received by each one of the one or more receiving devices as a counter value;
   identifying, by the MC server, the one or more receiving devices intended to receive the media streams from the one or more of the plurality of transmitting devices based on a synchronization source (SSRC) identifier associated with media streams of each of the one or more of the plurality of transmitting devices and the counter value;
   transmitting, based on the SSRC identifier and the counter value, by the MC server, media streams from the one or more of the plurality of transmitting devices to the identified one or more receiving devices;
   initializing the counter value to zero and emptying an SSRC list when the MC server enters a first state of not being permitted to receive media; and
   entering the first state from a second state of being permitted to receive media if the counter value reaches a minimum value.

2. The method as claimed in claim 1, wherein the media streams from the one or more of the plurality of transmitting devices are transmitted to the identified one or more receiving devices until the one or more receiving devices rejects the request to receive the plurality of media streams from the one or more of the plurality of transmitting devices.

3. The method as claimed in claim 1, further comprising:
   incrementing, the counter value by 1 and storing an SSRC of a transmission stream in the SSRC list for every receive media response message sent to the one or more receiving devices; and
   decrementing, the counter value by 1 and removing the SSRC of the transmission stream from the SSRC list for every stream ended from the one or more receiving devices.

4. The method as claimed in claim 3, wherein the counter value is decremented by 1 and the SSRC of the transmission stream is removed from the SSRC list after processing at least one of a media reception end request, a media reception end response, and a transmission end notify message.

5. The method as claimed in claim 3, wherein the counter value is decremented by 1 when an SSRC of a user transmitting the media to the one or more receiving devices is present in the SSRC list.

6. The method as claimed in claim 3, wherein a range of the counter value associated with each of the one or more receiving devices is configured based on parameters comprising at least one of a type of receiving device, a priority of a user associated with a receiving device and a network load associated with a receiving device.

7. The method as claimed in claim 1, wherein a state of the MC server is set to the first state of not being permitted to receive media when each of the one or more receiving devices rejects the request to receive each of the plurality of media streams from the one or more of the plurality of transmitting devices, and
   wherein the state of the MC server is set to the second state of being permitted to receive the media when at least one of the one or more receiving devices accept the request to receive the at least one media streams from the one or more of the plurality of transmitting devices.

8. The method as claimed in claim 1, further comprising transmitting a notification message to each of the one or more receiving devices when the one or more of the plurality of transmitting devices terminate transmission of the plurality of media streams to the MC server.

9. The method as claimed in claim 1, further comprising:
   receiving, by the MC server, at least one of a receive media request and a media reception end response message from the one or more receiving devices; and
   sending, by the MC server, at least one of a media transmission notify message and a transmission end notify message to the one or more receiving devices.

10. The method as claimed in claim 9, wherein receiving the receive media request message in a basic reception control state machine comprises:
    receiving, by the MC server, the receive media request message from the one or more receiving devices;
    rejecting, by the MC server, the receive media request message if the counter value reached an upper limit and sending a rejected response message;
    transmitting, by the MC server, a granted response message if the receive media request message is granted by MC server; and
    retaining, by the MC server, the second state of being permitted to receive media, wherein the rejected response comprises a reject cause, a reject indicator and a transmission indicator field indicating a reason for rejection.

11. The method as claimed in claim 10, wherein transmitting the granted response message comprises:
    sending, by the MC server, the receive media response message to the one or more receiving devices;
    increasing, by the MC server, the counter value by 1 if the counter value has not reached the upper limit;
    storing, by the MC server, the SSRC of the transmitting devices; and
    entering, by the MC server, the second state.

12. The method as claimed in claim 9, wherein receiving the reception end response message in a basic reception control state machine comprises:

receiving, by the MC server, the reception end response message from the one or more receiving devices;

releasing, by the MC server, downlink resources associated with a requested media stream reception; and maintaining, by the MC server, the second state of being permitted to receive media, and wherein sending the transmission end notify message in a basic reception control state machine, comprises:

sending, by the MC server, the media transmission end notify message to the plurality of transmitting devices;

including, by the MC server, the SSRC of the plurality of transmitting devices transmitting the media in the transmission end notify message; and maintaining, by the MC server, the first state of not being permitted to receive media.

13. The method as claimed in claim 9, wherein sending the media transmission notify message in a general reception control state machine comprises:

sending, by the MC server, the media transmission notify message to all other transmitting devices; and maintaining, by the MC server, a reception accepted state.

14. A mission critical (MC) server for handling a plurality of media stream receptions in an MC system, the MC server comprising:

at least one processor;

a transceiver; and a memory communicatively coupled to the processor, wherein the memory stores processor-executable instructions, which upon execution, cause the processor to:

transmit a request to each of one or more receiving devices for receiving plurality of media streams from a plurality of transmitting devices;

receive a response from each one of the one or more receiving devices for receiving a number of media streams among the plurality of media streams from the one or more of the plurality of transmitting devices and update the number of media streams as a counter value;

identify the one or more receiving devices intended to receive the media streams from one or more of the plurality of transmitting devices based on a synchronization source (SSRC) identifier associated with the media streams of each of the one or more of the plurality of transmitting devices and the counter value;

transmit, based on the SSRC identifier and the counter value, the media streams from the one or more of the plurality of transmitting devices to the identified one or more receiving devices;

initialize the counter value to zero and empty an SSRC list when the MC server enters a first state of not being permitted to receive media; and enter the first state from a second state of being permitted to receive media if the counter value reaches a minimum value.

15. The MC server as claimed in claim 14, wherein the processor is further configured to control transmission of the media streams from the one or more of the plurality of transmitting devices to the identified one or more receiving devices until the one or more receiving devices rejects the request to receive the plurality of media streams from the one or more of the plurality of transmitting devices.

16. The MC server as claimed in claim 14, wherein the processor is further configured to update the counter value based on a number of media streams accepted or rejected by each of the one or more receiving devices.

17. The MC server as claimed in claim 14, wherein the processor is further configured to configure a range of the counter value associated with each of the one or more receiving devices based on parameters comprising at least one of a type of receiving device, a priority of a user associated with a receiving device and a network load associated with a receiving device.

18. The MC server as claimed in claim 14, wherein the processor is further configured to set a state of the MC server to idle when each of the one or more receiving devices rejects the request to receive the plurality of media streams from the one or more of the plurality of transmitting devices.

19. The MC server as claimed in claim 14, wherein the processor is further configured to set a state of the MC server to active when at least one of the one or more receiving devices accept the request to receive the plurality of media streams from the one or more of the plurality of transmitting devices.

20. The MC server as claimed in claim 14, wherein the processor is further configured to control transmission of a notification message to each of the one or more receiving devices when the one or more of the plurality of transmitting devices terminate transmission of the plurality of media streams to the MC server.

* * * * *